Dec. 26, 1939. D. S. DE LAVAUD 2,184,606
HYDRAULIC POWER TRANSMISSION
Filed March 21, 1936 2 Sheets-Sheet 1

D. Sensaud De Lavaud
INVENTOR

By Glascock Downing & Seebold
Attys.

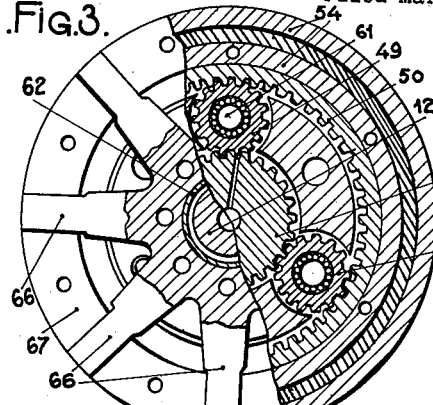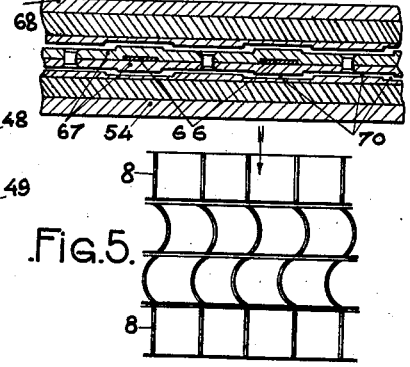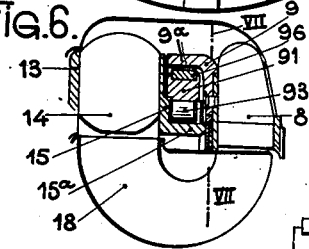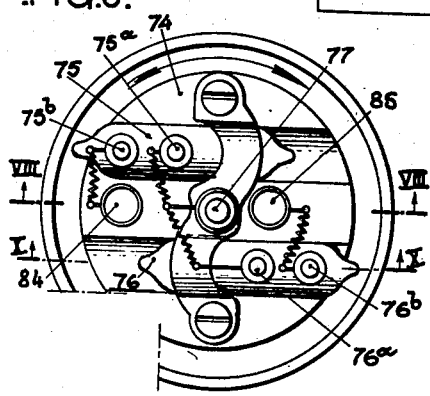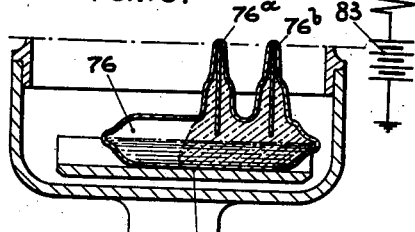

Patented Dec. 26, 1939

2,184,606

UNITED STATES PATENT OFFICE 2,184,606

HYDRAULIC POWER TRANSMISSION

Dimitri Sensaud de Lavaud, Paris, France

Application March 21, 1936, Serial No. 70,161
In France March 25, 1935

1 Claim. (Cl. 192—3.2)

Hydraulic couplings are already known in which the hydraulic circuit is of torus-like shape and constituted by two co-axial members provided with sets of blades, one of which, fast on the driving shaft, acts as pump and the other, fast on the driven shaft, acts as receiving turbine. In these couplings, the fluid is set in motion by the blades of the pump which is rotatively driven and this fluid acts on the blades of the turbine for causing the latter to rotate. Such couplings, usually known as Fottinger couplings, have an acceptable efficiency only for a distinctly defined speed of the turbine relatively to that of the pump and, from this fact, cannot serve as transmission between two shafts the relative speeds of which vary within wide limits.

For remedying this serious inconvenience and obtaining a hydraulic transmission having a continuously variable torque ratio whilst preserving an acceptable efficiency for the entire range of gearing-down ratios between the driving shaft and the driven shaft, in the above mentioned hydraulic circuit is arranged a third member provided with blades and prevented from rotating when the hydraulic transmission does not operate as a coupling. This member, so-called a guide vane ring and which is preferably arranged between the outlet of the turbine blades and the inlet of the pump blades, receives the fluid at the outlet of the turbine blades and has its blades so arranged that the fluid issuing from the guide vane ring returns to the pump blades according to such a direction that the fluid restores to the pump the energy which has not been absorbed during its passage in the blades of the turbine. In all these devices, the circulation of the fluid within the hydraulic circuit is produced by the blades of the pump and the flow of the fluid can be decomposed into two streams, a meridian stream and a tangential stream. This tangential stream is always directed in the same direction as the direction of rotation of the pump.

The object of the present invention is to provide a hydraulic device in which the circulation of the fluid is produced by the blades of the turbine and, for that purpose, it is characterised by the fact that the device comprises a driving member rigidly secured on the driving shaft and provided with blades arranged substantially according to meridian planes, a blade wheel or turbine rigidly secured on the driven shaft and provided with blades and prevented from rotating at least in the direction reverse to that of the rotation of the impeller or driving device and of the turbine, the three above mentioned members being co-axial and so arranged as to constitute a closed torus the casing of which is constituted by the shell of the impeller.

Such a device considerably differs from devices known up to this day. In fact, it will be seen that, in such a device, the member rigidly secured on the driving shaft no longer acts as a pump since its blades are at rest relatively to the enclosure in which the fluid circulates and substantially in meridian planes, and it results therefrom that if the blades of the impeller are flexible, they can, during working and under the thrust of the fluid, only yield rearwardly, so as to cause the fluid to flow in such a direction that the tangential component of this flow relative to the impeller blades is directed in reverse direction to the rotation, contrarily to what took place in all devices in which pumps were used for causing the fluid to circulate within the circuit. This fluid to which a rotary movement is imparted, reacts on the blades of the turbine for causing the latter to rotate, and it is these blades which, by their inclination, create the displacement or flow of the fluid within the hydraulic circuit without any possibility of tangential flow of the fluid relative to the impeller blades in the direction of rotation of the impeller.

Although the invention includes in its scope the use of rigid blades arranged on the impeller substantially according to diametral or meridian planes, a convenient form of construction is characterised by the fact that the blades of the impeller are flexible on the side the fluid issues and are so fitted up as to be inserted to a certain depth at their base and substantially according to meridian planes, or said blades can be slightly inclined in the direction of rotation of the impeller.

The use of impeller blades which are flexible on the side the fluid issues procures the following advantages: When working, said flexible blades are subjected to reactions from the fluid, the resultant of said reactions representing the value of the tangential stress of the driving torque, and this resultant having for effect to incline said blades in reverse direction to the direction of rotation, this causing an automatic regulation relatively to the driving torque. In fact, when the blades of the impeller incline, the absolute speed of the fluid when it issues from these blades diminishes, that is to say these blades check the circulation of the fluid produced by the blades of the turbine. As the result thereof the power required from the impeller diminishes for a constant speed of rotation, since this power is function of the circulation of the fluid, whereby the speed of the impeller can increase at the same time as the torque applied thereto, this increase being the more rapid as the inclination of the blades is greater, that is to say as the latter are more flexible. This condition is fulfilled whatever may be the respective speeds of the impeller and turbine, that is to say whatever may be gearing-down ratio, or, in other words, whatever may be the ratio of the torque. This allows, which is a very important feature, of utilising the entire power of the engine instead of utilising, as would take place with rigid blades, a portion only of the power of the engine, that is to say of that which is exerted on the driving shaft owing to the impossibility of causing the engine to rotate at a sufficient speed for a given resistant torque, that is to say a torque applied on the shaft of the given turbine.

Moreover, the inclination of the blades producing a reduction of the speed of circulation of the fluid for one and the same speed of rotation of the impeller and the efficiency of the hydraulic device being in reverse function to this speed of circulation, it will be seen that the use of flexible blades will cause the impeller to rotate at relatively high speeds by preserving the maximum efficiency owing to the fact that the meridian speed remains approximately constant. It will therefore be seen that with an impeller provided with right blades in which the speed of circulation is solely a function, for given blades of the turbine, of the speed of rotation of the impeller, it would not be possible to maintain an acceptable efficiency for high speeds of this impeller owing to an excessive speed of circulation of the fluid.

The invention further relates to a number of particular points, applied separately or according to any combinations:

1. A coupling device, actuated under the control of the speed of the driving shaft or of the driven shaft, is provided between the shells of the turbine and impeller so as to cause both these elements to be rendered rigid together, without slipping, when the speed of the driving or driven shaft reaches a certain value.

2. The coupling device according to 1 is constituted by an electromagnet the armature and winding of which are fitted upon the shell of one of the members to be coupled, the closing and opening of the circuit of the winding being controlled by a suitable switch automatically actuated in function of the speed of one of the driving or driven shafts.

3. The switch according to 2 is constituted by at least one mercury switch capable of rotating under the control of the driven shaft and so arranged that from a certain speed of this shaft, the mercury, under the influence of centrifugal force, automatically establishes a contact which closes the circuit of the electromagnet, rendering the impeller and turbine rigid together.

4. Use can be made of a plurality of switches according to 3, each of them closing for a definite speed of the driven shaft for instance, and a switch operated by the user allowing to switch on the desired mercury switch.

5. The impeller and the turbine can be rendered rigid together by means of jaws, rotatively driven by one of these devices and engaging with the other device under the action of centrifugal force and in antagonism to resilient devices suitably calibrated, in order that these jaws should be rendered operative for a definite speed of rotation of the member carrying them.

6. In order to prevent any slipping between the impeller and the turbine after the same have been rendered rigid together, the jaws are connected to the shell of the turbine through the medium of rollers fitted into notches of said jaws and capable of moving on suitable inclines provided on the turbine casing, so as to cause said jaws to wedge on the corresponding portion of the casing of the impeller.

7. These jaws might be arranged on the casing of the impeller so that the turbine and impeller should be rendered rigid together in function of the speed of the latter.

8. The intermediate shaft rendered rigid with the turbine is connected to the driven shaft proper through the medium of a gear relay allowing to obtain, with or without gearing-down, the rotation of the driven shaft in the same direction as or in reverse direction to that of the intermediate shaft on which the turbine is keyed.

9. The gear relay according to 8 is actuated by an electromagnetic control.

10. This relay is constituted by a sun wheel, rigid with the intermediate shaft, with which mesh planet pinions loosely mounted on pins angularly rigid with a disc made of magnetic metal and meshing, on the other hand, with an internally toothed crown wheel keyed on the driven shaft, said discs being subjected to the action either of a fixed electromagnet for causing the driven shaft to rotate in reverse direction to that of the driving shaft, or of an electromagnet movable with the driven shaft for causing the intermediate and driven shaft to rotate in the same direction and at the same speed, or said disc freely rotating for causing disengagement between said intermediate and driven shafts.

11. For avoiding the use of high power electromagnets for rendering the disc carrying the planet pinions rigid with the armature of the electromagnet with which it has come in contact upon energisation of said electromagnet, the side faces of the disc and armature are provided with corresponding notches which actually fit into each other.

12. For allowing mutual engagement of said notches without axial displacement of the disc carrying the pins of the planet pinions, these notches are provided in a crown wheel made of magnetic metal which is rendered angularly rigid with said disc through the medium of flexible arms in the direction of the axis of rotation of the disc.

13. In order to obtain a continuous flow in the turbine, the blades of the latter have externally the shape of half an egg-shell, whilst their inner face is concentric with the outer face of the blade situated immediately before.

The present invention relates to a number of particular points which will appear from the following description with reference to the accompanying drawings, given by way of example only, in which:

Fig. 3 is a section made through different transverse planes of Fig. 1, the left-hand portion of this Figure 3 being a section made according to line E—E of Fig. 1, and the right-hand portion, a section made according to line F—F of Fig. 1.

Fig. 4 is a developed section made according to line IV—IV of Fig. 1.

Fig. 5 is a diagrammatic developed view of the blades of the various members.

Fig. 6 is a partial sectional view of a modification of the device rendering the driving device and the turbine rigid together.

Fig. 7 is a section made according to line VII—VII of Fig. 6, one of the ends of the jaws being partially broken away.

Fig. 8 is an axial section made according to line VIII—VIII of Fig. 9, showing a centrifugal device for controlling the electromagnetic coupling between the impeller and the turbine shown in particular in Figs. 1 and 2.

Fig. 9 is a plan view of Fig. 8, the cover being removed.

Fig. 10 is a section made according to line X—X of Fig. 9.

In the various figures of the drawings, the same reference numbers designate the same members or members fulfilling the same function.

Figure 1:
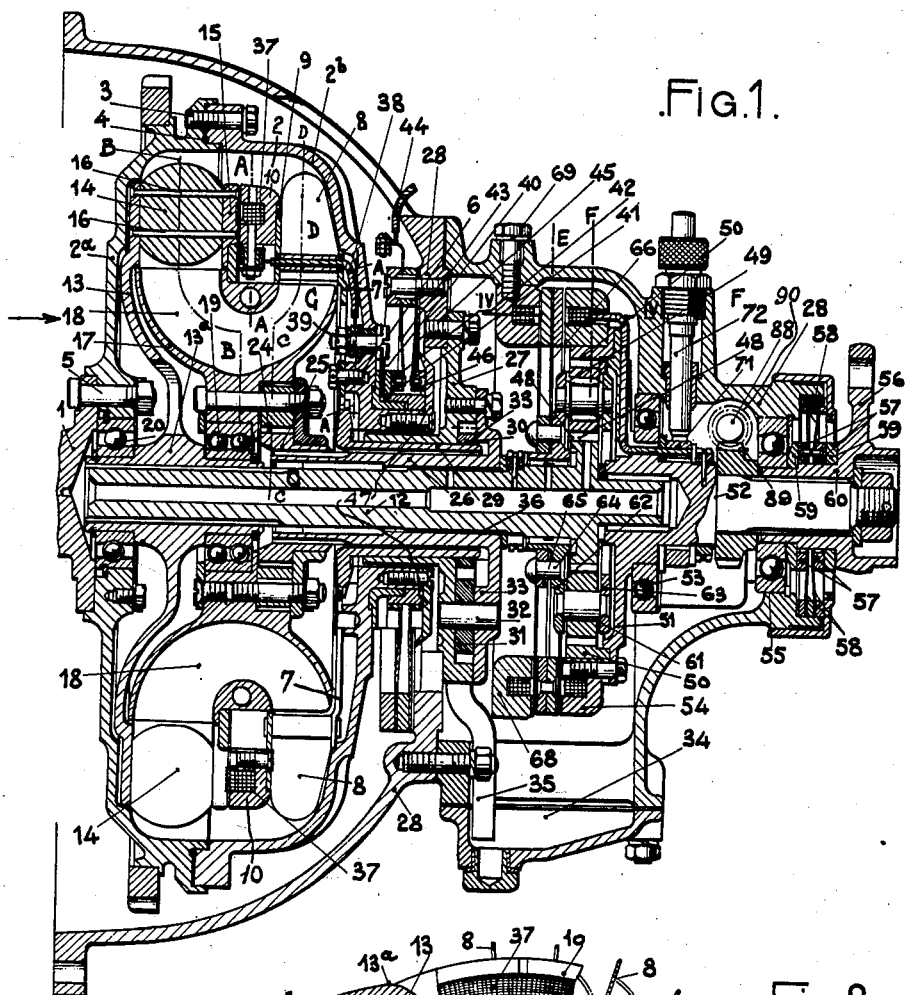
Fig. 1 is an axial longitudinal section of a form of construction of a hydraulic transmission device according to the invention.

On the end of a driving shaft 1 is fitted, in any suitable manner and for instance by means of bolts 5, or the like, one of the shells 2a of an impeller or driving device, the other shell 2b of which is peripherally connected to shell 2a in any suitable manner ensuring perfect fluid-tightness between both shells. Thus, as illustrated in Fig. 1, both shells 2a and 2b are rendered rigid together by means of screws 3, a sealing ring 4 having a cylindrical cross section being arranged in suitable recesses provided in the adjacent side faces of shells 2a and 2b. On the inner face of shell 2b is secured, by means of screws 6 for instance, a disc 7 on which are secured the blades 8 of the impeller device 2. These blades 8 are secured, on the other hand, on an inner crown or rim 9 which is connected, in the case of Fig. 1, to the armature 10 of an electromagnet.

Figure 2:
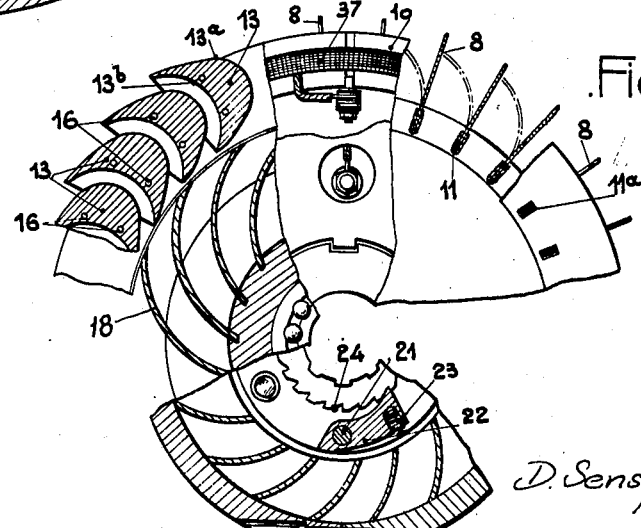
Fig. 2 is a section made through different transverse planes of Fig. 1, the upper portion of Fig. 2 being a section made according to line A—A of Fig. 1, the left-hand portion, a section made according to line B—B of Fig. 1, the lower portion, a section made according to line C—C of Fig. 1, and the right-hand portion, a section made according to line D—D of Fig. 1.

In the form of construction illustrated in Figs. 1 and 2 of the drawings, each of the blades 8 of the impeller is constituted by a flexible vane the end of which, located on the side the fluid enters the impeller, is secured to disc 7 and to crown 9. In the form of construction illustrated, the end of each of the blades 8 is clamped, on a certain length, in a U-shaped member 11, the ends of which fit into suitable perforations provided in disc 7 and crown 9 and are subsequently bent down as shown at 11a in Fig. 2, said members 11 being substantially set radially.

At the end of a shaft 12 is keyed a turbine plate 13 on which are secured the blades 14 of said turbine which are fastened, on the other hand, on an inner crown or rim 15. In the form of construction illustrated, these blades 14 are secured on the plate 13 and crown 15. According to the invention, and in order that the section of the passageway offered to the fluid between the blades 14 should be constant at all points, these blades 14 have externally, at 13a, the shape of half an egg-shell, whilst their inner face 13b is substantially concentric with the outer face 13a of the blade 14 situated immediately before. The inner crown 15 is arranged opposite the armature of electromagnet 10, and it is made of magnetic metal so as to be attracted and rendered rigid with the armature 10 of the electromagnet when the latter is energised. It will therefore be seen that, at this moment, the turbine 13 and impeller 2 are clutched so as to be substantially rigid together.

The other end of shaft 12 can be either directly connected to the member or be driven, or it can be connected to this member through the medium of any suitable devices, such-for instance as an electromagnetically controlled gear relay allowing the actuation of said driven member or shaft 52 in the same direction or in reverse direction to that of shaft 12, as will be explained later on.

Between the outlet of the blades 14 of turbine 13 and the inlet of blades 8 of impeller 2, is arranged a ring 17 provided with blades 18 and serving as guide vane ring. This guide vane ring is adapted to serve as "bearing" for the fluid streams when they issue from the turbine 13 in order to straighten them out for sending them in the blades 8 of impeller 2 according to a suitable angle. This guide vane ring 17 is fitted up, through the medium of a ball bearing 19, or the like, on the hub 13a of the shell or plate 13 of the turbine, said hub 13a being in its turn journalled, through the medium of a ball bearing 20, or the like, in an axial bore of the shell 2a of the impeller. Pawls 22 are pivoted about pins 21 on the guide vane ring 17, these pawls normally engaging, under the action of springs 23 suitably calibrated for substantially balancing the weight of said pawls, with the teeth of a ratchet 24 provided on a crown wheel 25 rigid with a stationary sleeve 26. This sleeve 26 is secured, by means of a cheek member 33, to a plate 27 which is itself secured to the fixed casing 28 of the device. It will be seen that, when the impeller 2 and turbine 13 rotate at the same speed, whether they are rendered rigid together or not through the medium of the electromagnetic or mechanical device provided for that purpose, the guide vane ring 17 will be caused to rotate in the same direction as these two elements, and the pawls 22 will immediately be disengaged from the teeth of the ratchet 24 under the action of centrifugal force in antagonism to the action of springs 23, thus avoiding wear of the ratchet and pawls as well as the noise of these latter when engaging with the teeth of said ratchet.

The inner bore of disc 7, rigid with the shell 2b of impeller 2, is provided with teeth engaging with corresponding teeth provided at the end of a sleeve 29, on the other end of which is keyed a toothed pinion 30 of a gear pump, the other pinion 31 of which is loosely mounted about a pivot pin 32. The casing of said gear pump is constituted by the plate 27 and by a suitable cheek member 33 provided at the end of sleeve 26. Said gear pump sucks the fluid in a suitable chamber 34 of the casing of the device through a piping 35. The fluid is delivered by said pump within the hydraulic device through an annular space 36 provided between sleeves 26 and 29. In this way, it will be seen that fluid is delivered under pressure within the hydraulic circuit, this having the effect of automatically compensating leakage which might occur, thus avoiding cavitations within said circuit.

The winding 37 of electromagnet 10 is grounded on one side and is connected, at its other end, and through the medium of a suitably insulated wire 38, to a terminal 39 provided on the shell 2b of the impeller, but suitably insulated from said shell. This terminal 39 is in contact with a conducting blade 40 which, in its turn, is in contact with a conducting ring 41 secured, by any suitable means, on the shell 2b of impeller 2. On the side face of said ring 41 resiliently bears a conducting ring 42 mounted on a resilient metal disc 43 which is secured, in any suitable manner, but in such a way as to be electrically insulated from the same, on the casing 28 of the hydraulic transmission. The disc 43 is connected, by a wire 44, to a suitable source of current supply, within interposition of at least one switch operated by hand or automatically, as will be explained later on.

The ring 42, resiliently pressed against ring 41, owing to its mode of mounting on the resilient disc 43, constitutes at the same time a fluid-tight joint preventing leakage of liquid within the casing 28. As illustrated in Fig. 1, this joint can be duplicated by another joint constituted in a similar manner by a resilient disc or ring 45 on the inner edge and outer face of which is secured a ring 46 resiliently bearing on a crown 47 rendered rigid, by any suitable means, with the shell 2b of the impeller, said disc 45 being secured in a fluid-tight manner at its periphery on the casing 28 of the hydraulic device.

In the form of construction illustrated, the free end of the intermediate shaft 12, at the other end of which the turbine is keyed, is provided with teeth 48 engaged by planet pinions 49 meshing, on the other hand, with an internally toothed crown wheel 50. This crown wheel 50, concentric with shaft 12, is rendered rigid, as well as the armature 54 of an electromagnet, with a plate 51 integral with the driven shaft 52. This shaft 52 is journalled in the casing 28 through the medium of ball bearings 53 and 55, and at its end is keyed a coupling flange 56, or the like.

Sealing members, two in number in the example shown, are arranged between the socket 60 of flange 56 and the casing 28. Each of these devices is constituted by a ring 57 mounted on a resilient disc 58 secured in a fluid-tight manner to the casing 28, the ring 57 resiliently bearing, owing to the disc 58, on a ring 59, or the like, mounted on the socket 60, or on the driven shaft 52.

The pivot pins 61, on which the planet pinions 49 are loosely mounted, are secured, on the one hand, on a disc 62 and, on the other hand, on a crown 63. The disc 62 is loosely mounted on the intermediate shaft 12 and on the hub of this disc 62 is secured, by any suitable means such as rivets 64 and a ring 65, a resilient web having a number of radial arms 66 to the end of which is secured a circular crown 67 made of magnetic metal. In the form of construction illustrated, this crown 67 is constituted by two identical crowns riveted together, Fig. 4, and between which the resilient radial arms 66 are clamped. This crown 67 is located, on the one hand, opposite the side face of the armature 54 of the electromagnet rendered rigid with the driven shaft 52 and, on the other hand, opposite the side face of the armature 68 of an electromagnet secured, by any suitable means such as screws 69, to the frame 28 of the device.

The side faces of crown 67 and that located opposite each of the electromagnets 54 and 68 are provided with corresponding notches 70 (see Fig. 4) so as to avoid any slipping movement between crown 67 and the armature of the electromagnet which is energised. In fact, it will be seen that, upon energisation of either of both electromagnets, crown 67 is subjected to a magnetic attraction which axially moved it in antagonism to the resiliency of radial arms 66, so that the corresponding side face of said crown comes in contact with the side face of the electromagnet which is energised and, owing to the mutual engagement of the notches 70 provided in these faces, it will be seen that no slipping movement occurs between both elements. This arrangement according to the invention allows of considerably reducing the power of the electromagnets which would be necessary for ensuring the connection with crown 67 in case the faces situated opposite each other would be smooth. In fact, owing to the notches according to the invention, the power required from the electromagnet must be simply sufficient for attracting crown 67 in antagonism to the resiliency of arms 66.

Each of the windings of electromagnets 54 and 68 is, on the one hand grounded and, on the other hand, it is connected to one of the terminals of a suitable source of current supply with interposition of a suitable switch. Concerning the winding of the rotary electromagnet, the connection is ensured through the medium of a conducting ring 71, mounted on the driven shaft 52, but suitably insulated from the latter, and on this ring rubs a brush 72, or the like, mounted on casing 28 so as to be insulated from the latter and connected to the source of current supply.

It will be seen that the energisation of electromagnet 54 will cause the planet pinions to receive a gyratory movement with the driven shaft 52, owing to the fact that the disc 62 carrying their pivot pins is then rigid with this driven shaft, whereby the intermediate and driven shafts will rotate in the same direction and at the same speed. If electromagnet 68 is energised, the planet pinions 49 are held against gyratory movement and intermediate shaft 12 and driven shaft 52 will rotate in reverse directions. If no electromagnet is energised, the intermediate shaft 12 and driven shaft 52 are disengaged.

As indicated above, the energisation of the windings 37 of electromagnet 10 ensures the connection between the impeller 2 and turbine 13. The closing and opening of the circuit energising electromagnet 10 can be ensured by means of a switch operated either manually, or automatically, in function for instance of the speed of rotation of the impeller or of that of the turbine.

Figs. 8, 9 and 10 illustrate a constructional example of an automatic switch for controlling the circuit energising the electromagnet 10. On a shaft 73 rotatatively driven either by driving shaft 1, or by intermediate shaft 12, or by driven shaft 52, is rigidly secured a plate 74 on which are eccentrically secured, by any suitable means, two mercury switches 75 and 76. The contacts 75a, 75b and 76a, 76b of these switches are so arranged as to be normally opened and closed by the mercury (see the portion in dotted lines of Fig. 10), when the speed of rotation of plate 74 reaches a certain predetermined value which will be different for the switches as will be seen later on.

The contacts 75a and 76a of the switches are grounded together at 77. The other contacts 75b and 76b are respectively connected to the contact pieces 80 and 81 of a manual switch, the movable arm 82 of which is connected to a suitable source of current supply 83 through the winding 37 of electromagnet 10. The connection between each of the contacts 75b and 76b and the contact pieces 80 and 81 is effected as follows: Contacts 75b and 76b are respectively connected to resilient contacts 84 and 85, of any suitable construction, which are mounted on the rotary plate 74 and insulated from the latter. These contacts 84 and 85 resiliently and respectively bear on conducting rings 86 and 87 mounted on the cover 79, so as to be electrically insulated from the latter, these rings being respectively connected to the bars 80 and 81 of the manual switch 82. It will be seen that, in this manner either of the switches 75 and 76 is set in action according to the position of switch 82. From this fact, the electromagnet 10 can be energized by either of the automatic switches 75 or 76, and it will be seen that by a suitable choice and adjustment of the latter, electromagnet 10 can be energized by either of two speeds of shaft 73, speeds suitably determined for instance by a greater or less eccentricity of said switches relatively to the axis of rotation.

In Fig. 1 of the drawings, shaft 73 is driven, through the medium of a suitable transmission, from a shaft 88 on which is keyed a helical wheel 90 meshing with a corresponding helical wheel 89 rigidly secured on the driven shaft 52, but it is obvious that the invention is not limited to this form of construction, and that shaft 73 might for instance be driven from the driving shaft 1.

Figs. 6 and 7 of the drawings illustrate a mechanical device for rendering the impeller 2 and turbine 13 rigid together, this device acting in function of the speed of turbine 13. The inner crown wheel 15 of turbine 13 is provided with a shoulder 15a on which normally rest jaws or weights 91, connected together by springs 92 suitably calibrated in function of the speed of the turbine 13 for which it is desired that the impeller 2 and turbine 13 should be rigid together. These weights 91 are associated with the shoulder 15a through the medium of rollers 93, or the like, which fit, on the other hand, on an incline 95 provided on said shoulder 15a. The inner crown wheel 9 of the impeller is also provided with a shoulder 9a situated opposite the weights 91 and with which comes in engagement upon operation, a wearing member 96 secured to each of said weights 91. The operation of the device is as follows: When the turbine 13 reaches the speeds at which it is desired to render it rigid with the impeller 2, the weights 91 move apart under the action of centrifugal force in antagonism to the action of the calibrated springs 92 and they come in engagement with the shoulder 9a of impeller 2. As the latter, owing to the hydraulic slipping movement, rotates more rapidly than turbine 13, it causes said weights to rotate relatively to the shoulder 15a in the direction of the arrow 97; the rollers 93 move on the inclines 95 and wedge the weights against shoulder 9a, thus preventing any relative slipping movement between the impeller 2 and turbine 13. As soon as the speed of the turbine 13 and, consequently, of the impeller 2 falls below the value corresponding to the calibration of the springs 92, the latter restore the weights 91, and the impeller and turbine 13 are disengaged.

The invention is not limited to the forms of construction described above and illustrated, but extends to all those utilising the features above set forth and allowing the desired result to be obtained.

What I claim as my invention and desire to secure by Letters Patent is:

In a hydraulic device for transmission of movement, an enclosure adapted to contain a liquid, a driving shaft keyed upon the said enclosure, impelling blades upon the said enclosure and arranged substantially according to diametral planes, a driven shaft coaxial with the said driving shaft, a turbine device keyed onto the said driven shaft, blades mounted on the said turbine device, a guide vane ring, a movement selecting device connecting the said guide vane ring to the frame whereby the said guide vane ring is prevented from rotating in a direction reverse to the direction of rotation common to the said driving and driven shafts, an electromagnet including an armature and a winding connected respectively to the said turbine device and to the said impelling blades, a source of current connected to the said winding, a plurality of automatic switches interposed between the said source and the said winding and mounted in parallel between them, a manually operated switch for putting in circuit one of the said automatic switches, each of which is operative for a definite speed of rotation of one of said devices.

DIMITRI SENSAUD DE LAVAUD.